Patented Nov. 15, 1927.

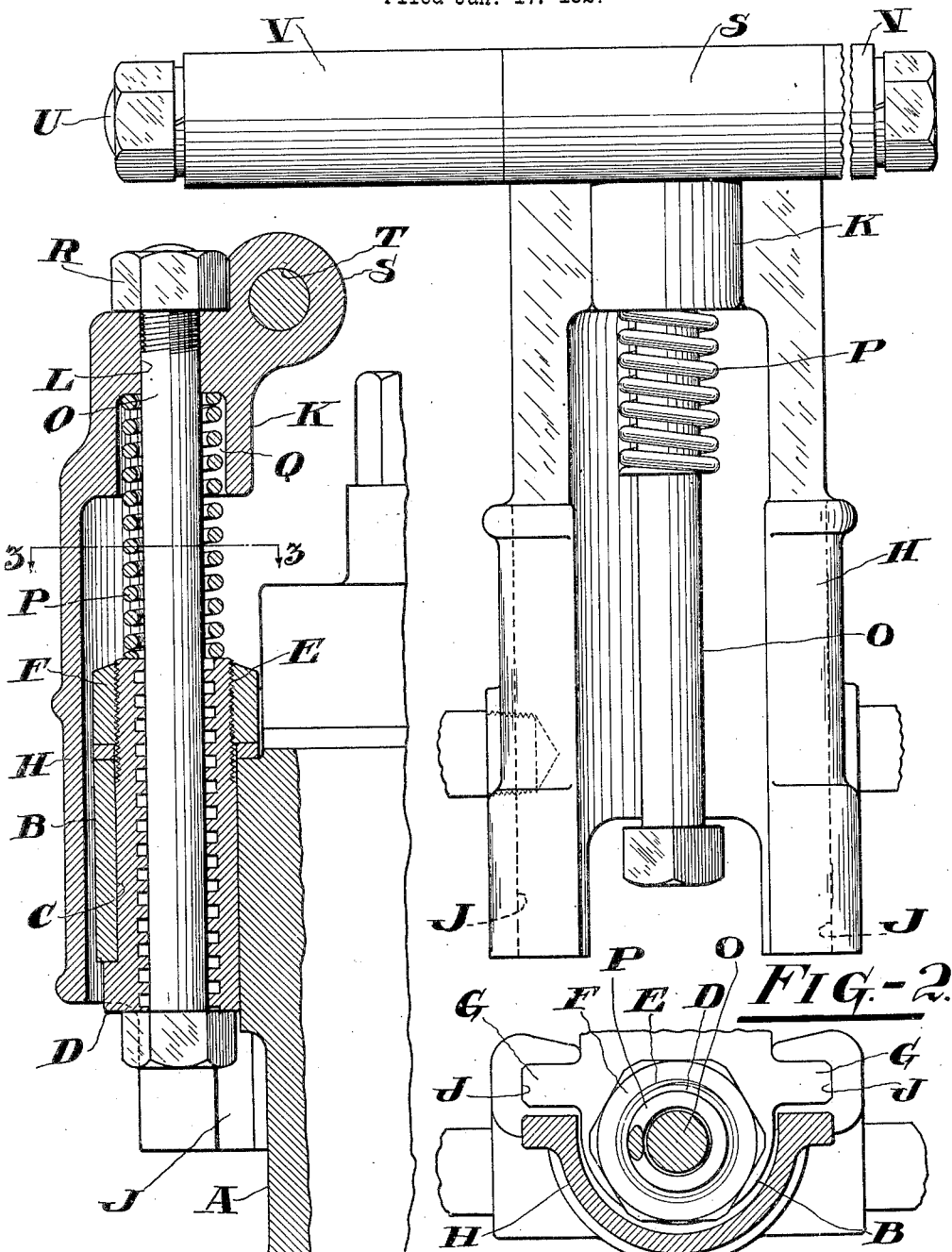

1,649,730

UNITED STATES PATENT OFFICE.

WILLIAM PRELLWITZ, OF EASTON, PENNSYLVANIA, ASSIGNOR TO INGERSOLL-RAND COMPANY, OF JERSEY CITY, NEW JERSEY, A CORPORATION OF NEW JERSEY.

SPRING HANDLE.

Application filed January 17, 1927. Serial No. 161,635.

This invention relates to rock drills, but more particularly to a spring handle for rock drills of the drifter type which are adapted to be guided and supported in operative position by a cradle or other equivalent means. Usually suitable guides are formed on the drill cylinder to cooperate slidably with guidways in the cradle and the drill is caused to reciprocate in the cradle under the action of a feed screw which cooperates with a suitably threaded portion of the drill and is anchored rotatably at its front end to the cradle.

The present invention is more particularly, though not exclusively, intended for use in connection with drifters of the smaller sizes which may be conveniently manipulated by one attendant, and its objects are to render a rock drill of the drifter type capable of use as a hand held drill, to prevent the transmission of shock and vibration from the drill to the operator and to enable the spring handle to be quickly attached to or removed from the drill.

Other objects will be in part obvious and in part pointed out hereinafter.

The invention consists of the combination of elements and features of construction having the general mode of operation substantially as hereinafter described and claimed and illustrated in the accompanying drawings, in which Figure 1 is a sectional elevation of the handle showing it applied to a rock drill, Figure 2 is a front elevation of the handle, and Figure 3 is a transverse view through Figure 1, taken on the line 3—3, looking in the direction of the arrows.

Referring to the drawings, the invention is shown applied to a rock drill, only a portion of a cylinder A being shown for illustrative purposes. The cylinder A has a lug B on one side in which is formed an aperture C for the reception of a feed nut D. The feed nut D is threaded interiorly to cooperate with the usual feed screw (not shown) commonly used in drills of the type illustrated for advancing and retracting the drill in the cradle or other means which may be provided for supporting and guiding the drill with respect to the work. The feed nut D extends rearwardly of the lug B and is threaded exteriorly as at E to receive a nut F whereby the feed nut D is held securely in the aperture C.

Usually in drills of the type to which the present invention pertains, suitable means are provided for slidably interlocking the drill and its supporting cradle. Such means may consist, as in the present instance, of guides G disposed on opposite sides of the cylinder A to cooperate slidably with suitable guidways in the cradle.

According to the present invention, a cradle H intended to be substituted for the usual type of supporting cradle, is provided with interior guideways J to receive slidably the guides G of the cylinder A. In cross section the cradle H conforms substantially to the shape of the cradle which it displaces and is intended to contact only with the cylinder at the guides G. The rearward end of the cradle H terminates in a solid portion or wall K through which is formed an aperture L for the reception of a bolt O. The bolt O in this instance is of a diameter to fit slidably the faces of the threads in the feed nut and is of a length to enable the wall K of the cradle H to normally lie at a suitable distance rearwardly of the rearwardmost portion of the feed nut D.

To the end that the cradle H may be normally held in retracted position as well as to cushion the cradle H against the transmission of shock and vibration of the rock drill, a spring P is disposed about the bolt O and in this instance is seated with one end on the rearward end of the feed nut D and with its other end against the roof of a recess Q in the wall K. In this way the head of the bolt O is also pressed firmly against the front end of the feed nut D. A nut R screwed on the rearward end of the bolt O bears against the end of the wall K to form a rearward abutment for the cradle H.

In the present instance a boss S is formed at the rearward end of the wall K and is preferably off-set with respect thereto. In this boss S is formed an aperture T and a bolt U is extended therethrough to receive at the ends grip portions V of a suitable diameter to form a handle whereby the rock drill may be manipulated.

The present invention may be readily applied to a rock drill by merely removing the feed screw and the shell from the rock drill. The bolt O may then be inserted in the feed nut D and the spring P placed about the bolt to bear against the feed nut D and the wall K. Thereafter, the cradle H may be placed in a position that will permit the entrance of the guides G into the guideways J. This position will also enable the bolt O to be readily inserted through the aperture L, whereupon the nut R may be screwed on the end of the bolt to hold the cradle H in slidable engagement with the guides G.

The principal advantages of the present invention are that a rock drill of the drifter type may be quickly converted into a hand held drill and the operator will at all times be well protected against the shocks and vibration set up in the drill during its operation.

I claim:

1. A spring handle for a rock drill, comprising a cradle having guideways to receive the shell guides of a rock drill whereon said cradle is adapted to slide, means for connecting the cradle to the drill, a spring acting against the cradle and the drill to cushion the cradle, and grip members on the cradle for manipulating the rock drill.

2. A spring handle adapted to be substituted for the shell of a rock drill, comprising a cradle having internal guideways to cooperate slidably with the shell guides of the rock drill, a bolt for holding the cradle on the shell guides, a spring acting against the cradle and the rock drill for holding the cradle in retracted position, and grip members on the cradle for manipulating the rock drill.

3. A spring handle adapted to be substituted for the shell of a rock drill, comprising a cradle having internal guideways to receive the shell guides of the rock drill whereon the cradle is adapted to slide, a bolt slidable through the cradle and the rock drill for holding said cradle on the shell guides, a spring encircling the bolt and acting against the cradle and the rock drill for cushioning relative longitudinal movement between the cradle and the rock drill, and lateral grip members on the cradle for manipulating the rock drill.

In testimony whereof I have signed this specification.

WILLIAM PRELLWITZ.